Figure 1:
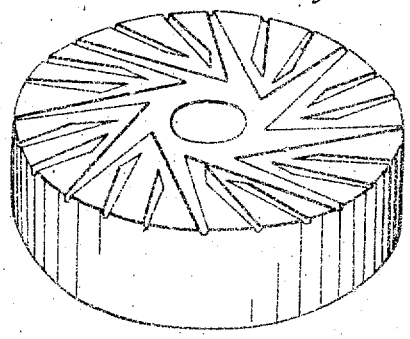
Figure 2:
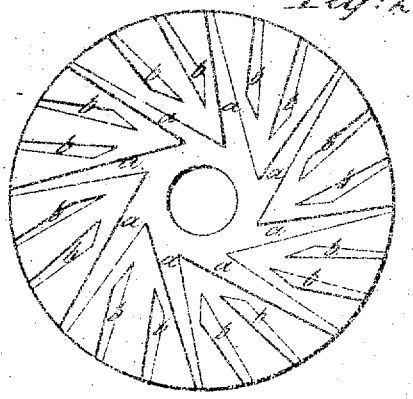

9108X

D. B. Napier,

Mill Stone Dress.

Patented Sept. 18. 1835.

NO PRINTED COPY OF SPECIFICATION IN OFFICE

David B. Napier of the County of Casey, Kentucky,

Letters Patent

The schedule referred to in these Letters Patent and making part of the same containing a description in the words of the said David B. Napier himself of his improvement in the art of dressing Mill Stones To all to whom these presents shall come, Be it known that I David B. Napier of the County of Casey and State of Kentucky, have invented a new and useful improvement in the art of dressing Mill Stones, and that the following is a full and exact description of the construction and operation of the said machine as invented or improved by me to wit. The leading furrows for dressing mill stones should be cut half inch deep, and from one and a half to one and three fourths of an inch wide, at the end towards the centre of the stone and graduate to one fourth of an inch deep and three quarters of an inch wide at the verge of the stone. the furrows should be cut round representing a gauge. Mill stones three feet and under, should be divided into eight equal parts laid out as above stated & are termed leading furrows. which I give one inch to the foot draft, ie„ 3 foot stone 3 inches draft, 4 foot stone 4 inches draft &c. &c. In laying off, a mill stone should it be 4 feet, over I describe an eight inch circle at the centre, and draw right angle lines, should the stone run to the right, lay the furrow strip at the end of one of the right angle lines and the other end of the strip at the left of the centre where the other right-angle line crosses the eight inch or draft circle which gives the leading furrows 4 inches draft from the centre in a 4 foot stone. I sub dide the stone into three equal parts on the verge for laying out the short furrows. make a strip of proper length & one inch wide lay it to the draft circle and divisions on the verge of the stone which will form furrows running nearly parallel with the leading furrows, then cut them off by laying a strip 1½ inches in width, precisely parallel with the leading furrows. The only right I claim is in graduating the long or leading furrows so as to receive the feed freely and the draft of the short furrows so as to make them face one each other at an angle of about 25 or 30 degrees,
Each Mill stone should be perfect true from the centre to the verge i.e.
Bed stone and Runner they then commence grinding at or near the centre (and
will grind faster than any other plan of dressing in my knowledge) 28th
July 1835.—

(D. B. Napier.)

Witness Seth Swaney
C. K. Coffey 528 words (Drawing)

Ex.
C.J.W.